United States Patent

Bulgatz et al.

[11] Patent Number: 6,067,000
[45] Date of Patent: May 23, 2000

[54] ELECTROMAGNETIC ACTUATOR UPPER SPRING ASSEMBLY

[75] Inventors: Dennis Bulgatz, Williamsburg; Timothy S. Roach, Norfolk, both of Va.

[73] Assignee: Siemens Automotive Corporation, Auburn Hills, Mich.

[21] Appl. No.: 09/235,050

[22] Filed: Jan. 21, 1999

[51] Int. Cl.⁷ .................. F16F 1/06; F16F 1/12; H01F 7/08; H01F 7/13

[52] U.S. Cl. .......................... 335/274; 267/175

[58] Field of Search .................. 335/269, 274; 74/582, 592; 254/10.5; 123/90.11; 267/170, 171, 174, 175, 177

[56] References Cited

U.S. PATENT DOCUMENTS

| | | | |
|---|---|---|---|
| Re. 33,490 | 12/1990 | Steinbock | 29/116.2 |
| 634,090 | 10/1899 | Mott . | |
| 4,338,037 | 7/1982 | Deminski | 403/24 |
| 4,581,994 | 4/1986 | Wildmann | 101/363 |
| 4,810,919 | 3/1989 | Ponce et al. | 310/217 |
| 5,083,889 | 1/1992 | Steinbock | 411/432 |
| 5,548,263 | 8/1996 | Bulgatz et al. | 335/274 |
| 5,782,454 | 7/1998 | Bulgatz et al. | 251/129.1 |

*Primary Examiner*—Lincoln Donovan
*Assistant Examiner*—Raymond Barrera

[57] ABSTRACT

An electromagnetic actuator 10 includes housing structure 12, first and second electromagnets 14 and 16 disposed in spaced relation in the housing structure, an armature 24 mounted for reciprocal movement between the electromagnets, and a spring assembly 11 operatively associated with the armature 24. The spring assembly includes a coil spring 30, a spring retainer 32 carrying the coil spring and being constructed and arranged to contact the armature 24, a spring adjusting member 38 engaged with a bore in the housing structure 12 and engaging the spring 30 so as to control compression of the spring associated with a set position of the armature 24 between the electromagnets. At least one cap screw 50 extends from a surface of the housing structure generally adjacent to the bore. A locking member 56 is engaged with the spring adjusting member 38 and with the cap screw 50. The cap screw 50 pushes against the locking member 56 to prevent movement of the spring adjusting member 38 to maintain the compression of the spring 30 associated with the set position of the armature 24.

15 Claims, 3 Drawing Sheets

ELECTROMAGNETIC ACTUATOR UPPER SPRING ASSEMBLY

FIELD OF THE INVENTION

This invention relates to an electromagnetic actuator for a vehicle engine and, more particularly, to the adjustment of an armature using an upper spring assembly of the actuator.

BACKGROUND OF THE INVENTION

A conventional electromagnetic actuator for opening and closing a valve of an internal combustion engine generally includes "open" and "close" electromagnets which, when energized, produce an electromagnetic force on an armature. The armature is biased by a pair of springs arranged in parallel. The armature is coupled with a gas exchange valve of the engine. The armature rests approximately half way between the open and close electromagnets when the springs are in equilibrium. When the armature is held by a magnetic force in either the closed or opened position (at rest against the open or close electromagnet), potential energy is stored by the springs. If the magnetic force is shut off with the armature in the opened position, the spring's potential energy will be converted to kinetic energy of the moving mass and cause the armature to move towards the close electromagnet. If friction is sufficiently low, the armature can then be caught in the closed position by applying current to the close electromagnet.

When an actuator is installed in a vehicle the armature has to be centered between the two electromagnets. This is typically done by adjusting the compression of the upper spring of the actuator. Once the center position is found, the spring must remain in the compressed state associated with the centered armature. The slightest change in the compression of the upper spring will result in an un-centered armature, which may cause improper operation of the actuator.

Thus, there is a need to provide a spring assembly for an electromagnetic actuator which permits fine adjustment to center the armature between two electromagnets, and once centered, prevents further adjustment of the compression of the spring and thus, the position of the armature.

SUMMARY OF THE INVENTION

An object of the present invention is to fulfill the need referred to above. In accordance with the principles of the present invention, this objective is obtained by providing an electromagnetic actuator including a housing structure, first and second electromagnets disposed in spaced relation in the housing structure, an armature mounted for reciprocal movement between the electromagnets, and a spring assembly operatively associated with the armature. The spring assembly includes a spring, a spring retainer carrying the spring and being constructed and arranged to contact the armature, a spring adjusting member engaged with a bore in the housing structure, with the spring adjusting member engaging the spring so as to control compression of the spring associated with a set position of the armature between the electromagnets. The spring assembly also includes at least one engaging element extending from a surface of the housing structure, and a locking member engaged with the spring adjusting member and with the engaging element. The engaging element pushes against the locking member to prevent movement of the spring adjusting member to maintain the compression of the spring which is associated with the set position of the armature.

In accordance with another aspect of the invention, a method is provided for adjusting a position of an armature of an electromagnetic actuator. The actuator has a housing structure including a threaded bore therein, and first and second electromagnets disposed in spaced relation in the housing structure with the armature being mounted for reciprocal movement between the electromagnets. The actuator also includes a spring assembly operatively associated with the armature. The spring assembly includes a spring, a spring retainer for carrying the spring and having a contact portion constructed and arranged to contact the armature, a spring adjusting member having a spring engaging surface and having external threads, at least one cap screw, and a locking member having a counterbore defining a stop surface for engaging a head of the cap screw. The method includes placing the spring retainer in the housing structure such that the contact portion thereof is in a position to contact the armature. The spring is placed onto the spring retainer so that the spring is carried by the spring retainer. The spring adjusting member is screwed into the threaded bore in the housing structure with the spring engaging surface engaging the spring. The contact portion of the spring retainer is in contact with the armature. The spring adjusting member is moved within the threaded bore to control compression of the spring thus moving the contact portion and adjusting the position of the armature so as to be in an operative position. The cap screw is screwed into the housing structure so as to extend therefrom. The cap screw is disposed generally adjacent to the threaded bore. The locking member is screwed onto the external threads of the spring adjusting member so that the counterbore is generally adjacent to the head of the cap screw. Finally, the cap screw is backed-out from the housing structure so that the head of the cap screw engages the stop surface of the locking member, thereby pushing against the locking member and thus locking the spring adjusting member to maintain the compression of the spring which is associated with the armature being in the operative position.

Other objects, features and characteristic of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

DETAILED DESCRIPTION OF THE INVENTION

Figure 1:
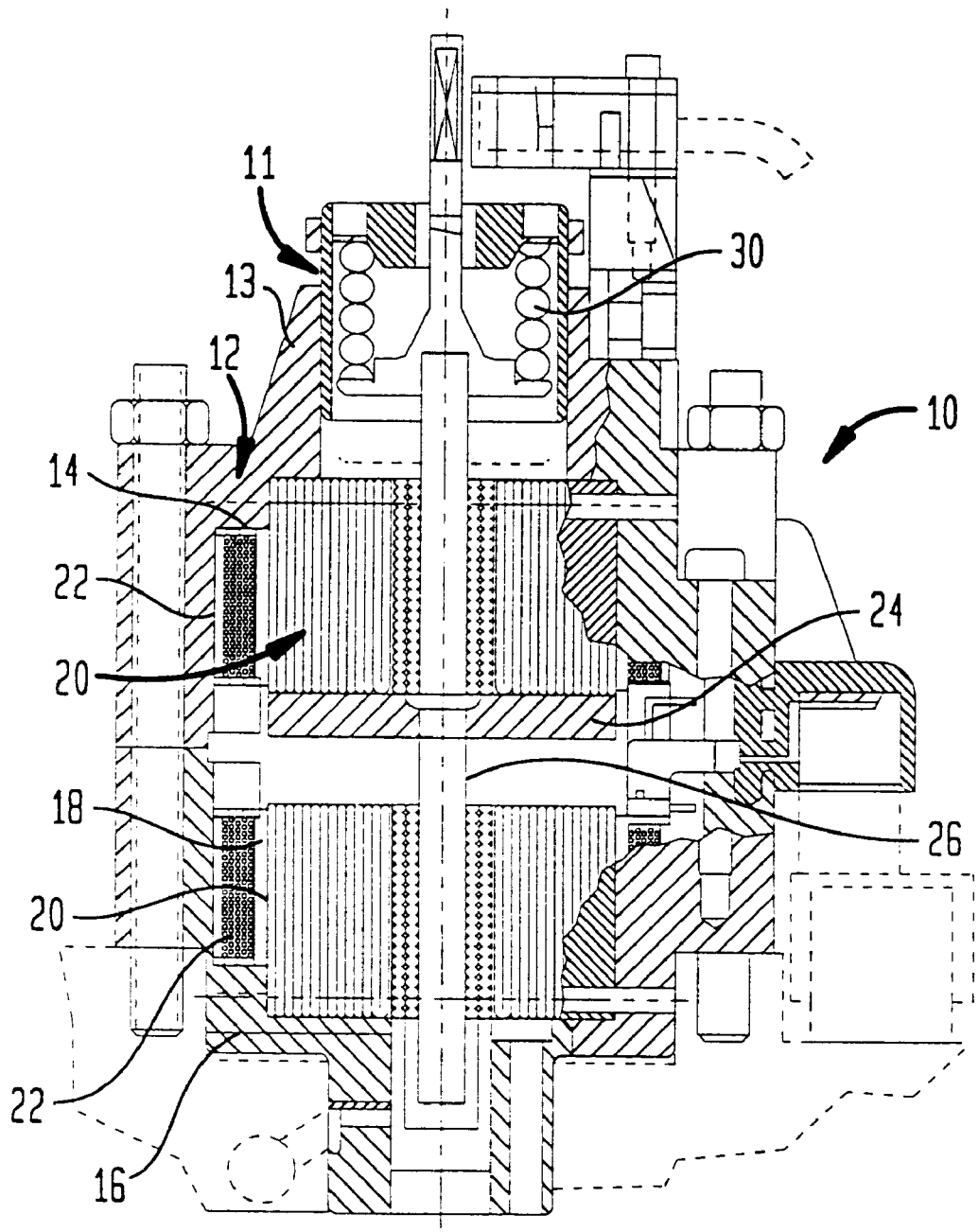
FIG. 1 is a sectional view of an electromagnetic actuator having an upper spring assembly provided in accordance with the principles of the present invention.

Referring to FIG. 1, an electromagnetic actuator is shown, generally indicated 10, having an upper spring assembly, generally indicated at 11, provided in accordance with the principles of the present invention. The electromagnetic actuator 10 includes a housing structure, generally indicated at 12, including an upper housing 13 and a lower housing 16. Although a two-piece housing structure is shown, it is within the contemplation of the invention to provide a one-piece housing structure. The upper housing 13 contains an upper electromagnet 14, and a lower housing 16 contains a lower electromagnet 18. Each electromagnet 14 and 18 includes a core assembly, generally indicated at 20, and a coil assembly 22. An armature 24 is arranged for movement between the electromagnets 14 and 18. The armature 24 is carried by a reciprocating shaft 26. The shaft 26 is configured to be coupled to a stem of a gas exchange valve (not shown) of an engine of a vehicle in the conventional manner. A pair of opposing springs are associated with the armature 24. The upper spring 30 is shown in FIG. 1. The other spring, a valve spring (not shown) is disposed near the cylinder valve.

Figure 2:
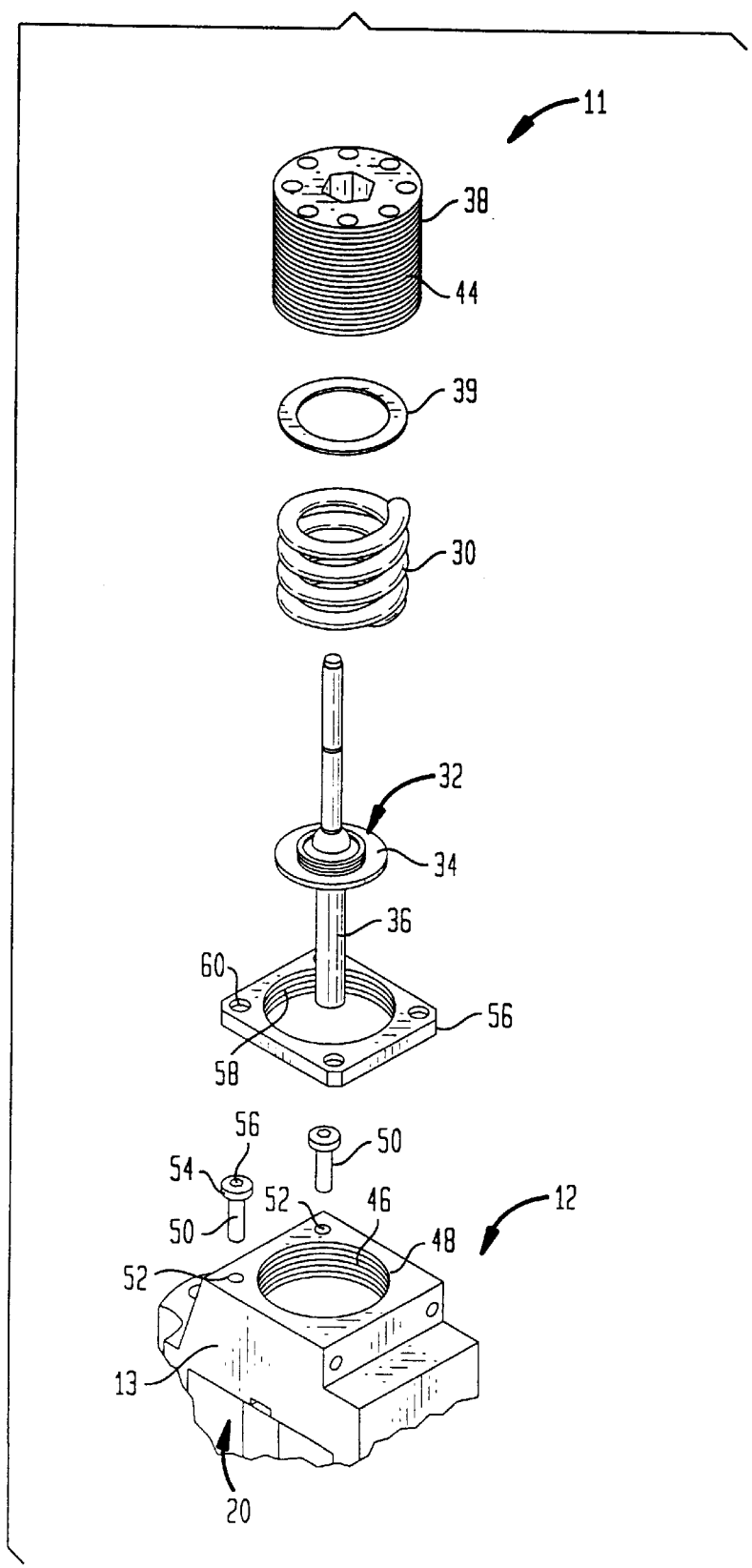
FIG. 2 is an exploded view of an upper spring assembly of the electromagnetic actuator of FIG. 1.
Figure 3:
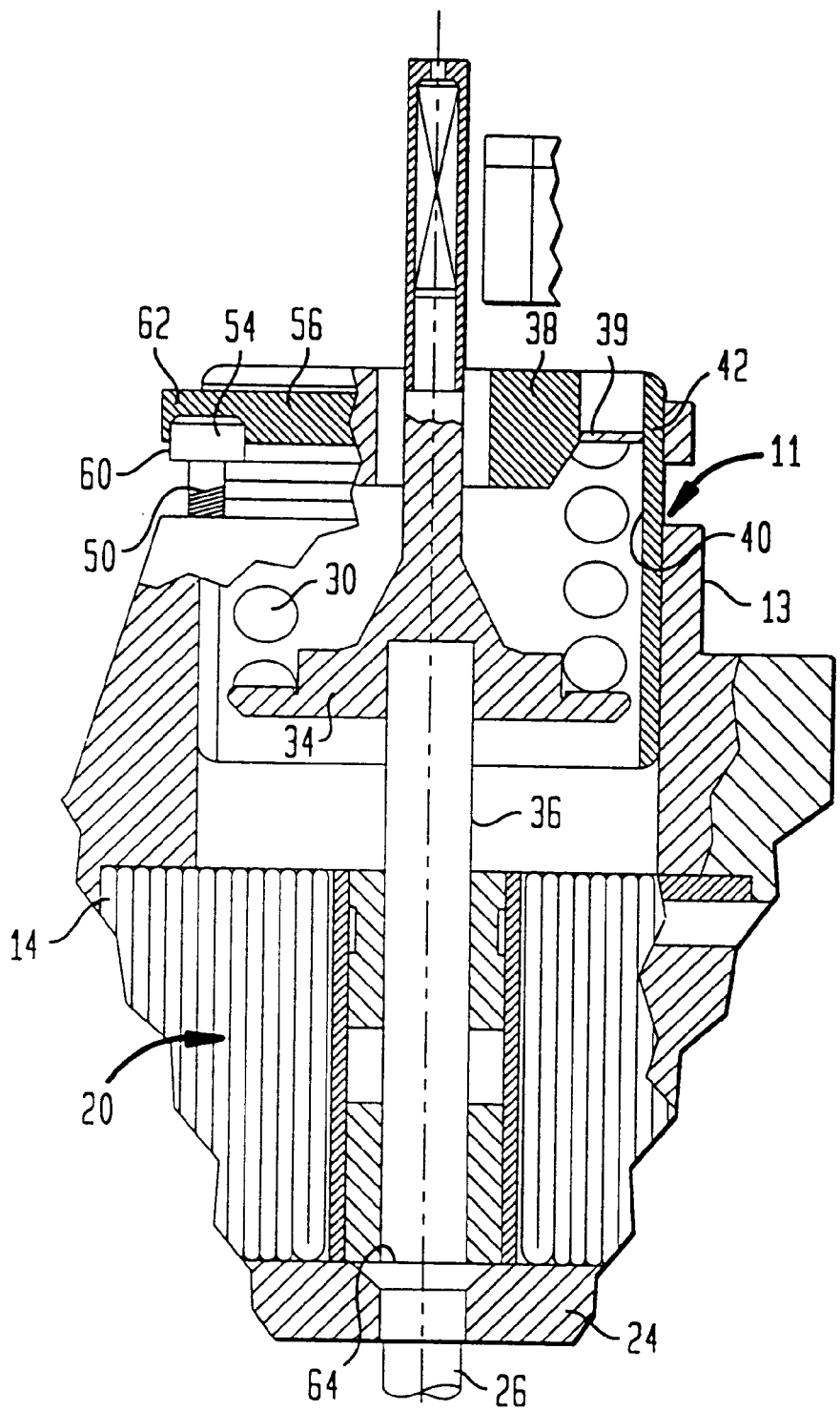
FIG. 3 is a sectional view of the upper spring assembly of the of FIG. 2, shown assembled in an electromagnetic actuator.

With reference to FIG. 2, the upper spring assembly 11 includes the upper coil spring 30 and a spring retainer generally indicated at 32, carrying the spring 30. The spring retainer 32 includes an annular flange 34 for receiving the spring 30 thereon. A shaft 36 is coupled to the flange 34. The shaft 36 is constructed and arranged to contact the armature 24, the function of which will be explained below. The spring assembly 11 also includes a spring adjusting member 38 of generally cup-shape having an inner chamber 40 (FIG. 3) for receiving the spring 30 and a spring engaging surface 42 (FIG. 3) for engaging the spring 30. In the illustrated embodiment, a washer 39 is provided between the spring engaging surface 42 and the spring 30. The washer 39 may be considered to be part of the spring adjusting member 38 and when used, may be considered to be the spring engaging surface. The external portion of the generally cylindrical spring adjusting member 38 includes threads 44 so as to engage threads 46 of bore 48 defined in the housing structure 12. At least one engaging element, preferably in the form of a cap screw 50, is threaded into a threaded bore 52 in the housing structure 12 so as to extend from a surface of the housing structure 12 generally adjacent to the bore 48. The length of the cap screws 50 is such that it may be back-out a bit from the threaded bore 52 yet remain in threaded engagement with the housing structure 12. The cap screw includes a head 54 having a tool engaging feature 54 therein. In the illustrated embodiment, two caps screws 50 are provided. Three or more cap screws 50 may also be provided if desired.

A locking member 56 is provided to lock the spring adjusting member 38 once an operative position of the armature has been set, as explained below. The locking member 56 includes a threaded bore 58 therein configured to be received by threads 44 of the spring adjusting member 38. In addition, the locking member 56 includes a counterbore 60 associated with each caps screw 50. Each counterbore defines a stop surface 62 for engaging the head 54 of an associated cap screw 50.

A method of adjusting a position of the armature 24 is as follows. The spring retainer 32 is placed into the housing structure 12 through bore 48 such that a contact portion (shaft 36) thereof extends though a bore the upper electromagnet 14 and is in position to contact the upper surface 64 of the armature 24. The spring 30 is placed onto flange 34 of the spring retainer 32 so that the spring 30 is carried by the spring retainer 32. The washer 39 is placed inside the spring adjusting member 38 and the spring adjusting member 38 is screwed into the threaded bore 48 in the housing structure 12. This causes the spring 30 to engage the spring engaging surface 42 of the spring adjusting member 38 (via washer 39). The actuator 10 is activated with the valve spring (not shown) pushing the armature 24 to its uppermost position adjacent to the upper electromagnet 14 (FIG. 3) which ensures that the shaft 36 of the spring retainer 32 may contact the upper surface 64 armature 24. The spring adjusting member 38 is moved within the threaded bore 48 which controls the compression of spring 30 and causes the shaft 36 to contact the armature 24 to adjust the position of the armature 24 so as to be in an operative, generally centered position with respect to the electromagnets 14 and 18. The spring 30 applies a load to the spring adjusting member 38 in a load direction. At least one cap screw 50 is screwed into threaded bore 52 of the housing structure 12 so as to extend therefrom. If more than one cap screw 50 is used, then each cap screw 50 is installed into the housing structure 12 to extend therefrom. The locking member 56 is then screwed onto the threads 44 of the spring adjusting member 38 so that each counterbore 60 is generally adjacent to the head 54 of an associated cap screw 50. The cap screw(s) 50 is then backed-out from the housing structure 12 so that the head 54 of the cap screw 50 engages the associated stop surface 62 of the locking member 56, thereby pushing against the spring adjusting member 38 in the load direction. This locks the locking member 56 and thus the spring adjusting member 38 in position to maintain the compression of the spring 30 which is associated with the armature 24 being in the operative, generally centered position.

Thus, the spring adjusting member 38 is locked in the same direction as the spring forces exerted against it, by the cap screws 50 pushing on the locking member 56. Since the spring 30 and the cap screws 50 create forces on the spring adjusting member 38 acting in the same direction, there is no movement of the spring adjusting member 38 due to thread lash, which would disadvantageously cause the compression of the spring 30 to change after setting the armature 24 to the operative or set position. Thread lash is the relative movement of mating threaded parts permitted by thread clearances that are required to permit assembly and operation of the threads.

Relative movement of the spring adjusting member with respect to the housing structure 12 would occur if the cap screws 50 were screwed downwardly (with regard to FIG. 3) to lock the locking member 56, thus reversing the load on the threads applied by the compression spring 30 and causing relative movement of the parts to take up the thread lash. In that case, the armature setting would be changed when the cap screws were tightened.

Although the engaging element was illustrated as a cap screw 50 which locks the locking member 56, the engaging element may be in the form of a clip which engages the locking member 56 and the housing structure to prevent rotation of the locking member 56 and thus the spring adjusting member 38.

Once the spring adjusting member 38 is locked in position, the actuator 10 is ready to operate in the conventional manner, wherein when the armature 24 is held by a magnetic force in either the closed or opened position (at rest against the upper or lower electromagnet), potential energy is stored by the upper spring or the valve spring. If the magnetic force is shut off with the armature 24 the opened position, the valve spring's potential energy will be converted to kinetic energy of the moving mass and cause the armature 24 to move towards the upper electromagnet 14. If friction is sufficiently low, the armature 24 can then be caught in the closed position by applying current to the upper electromagnet.

Thus, the invention provides an effective means of adjusting the location of the armature 24 by controlling the compression of the upper spring 30, when the actuator 10 is installed into a vehicle. Once adjusted, the appropriate members are locked to maintain the compression of the spring 30 which is associated with the centered armature 24.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. An electromagnetic actuator comprising:

a housing structure, first and second electromagnets disposed in spaced relation in said housing structure, an armature mounted for reciprocal movement between said electromagnets, and a spring assembly operatively associated with said armature, said spring assembly comprising:

a spring, a spring retainer carrying said spring and being constructed and arranged to contact said armature, a spring adjusting member engaged with a bore in said housing structure, said spring adjusting member engaging said spring so as to control compression of said spring associated with a set position of said armature between said electromagnets, said spring applying a load to said spring adjusting member in a load direction, at least one engaging element extending from a surface of said housing structure generally adjacent to said bore and movable towards and away from said surface of said housing, and a locking member engaged with said spring adjusting member and with said engaging element, said engaging element pushing against said locking member in said load direction to prevent movement of the spring adjusting member to maintain the compression of the spring associated with the set position of the armature.

2. The electromagnetic actuator according to claim 1, wherein said bore is a threaded bore and said spring adjusting member is of generally cylindrical shape having external threads thereon engaging said threads of said bore.

3. The electromagnetic actuator according to claim 2, wherein said spring adjusting member includes an inner chamber having a spring engaging surface, said spring being disposed in said chamber and said spring engaging surface causing compression of said spring to change upon movement of said spring adjusting member in said bore.

4. The electromagnetic actuator according to claim 3, wherein a washer is disposed in said spring adjusting member and defines said spring engaging surface.

5. The electromagnetic actuator according to claim 1, wherein said spring is a coil spring.

6. The electromagnetic actuator according to claim 5, wherein said spring retainer includes an annular flange engaging said spring and a shaft extending from said flange, said shaft being constructed and arranged to engage said armature.

7. The electromagnetic actuator according to claim 2, wherein said locking member includes a threaded bore therein engaging the external threads of said spring adjusting member.

8. The electromagnetic actuator according to claim 1, wherein said at least one engaging element comprises a cap screw threadedly engaged with said housing structure.

9. The electromagnetic actuator according to claim 8, wherein said locking member includes at least one counterbore therein defining a stop surface, a head of said cap screw engaging said stop surface to prevent movement of said locking member and thus said spring adjusting member.

10. The electromagnetic actuator according to claim 8, wherein a plurality of caps screws are threadedly engaged with said housing structure and said locking member includes a plurality of counterbores therein each receiving an associated cap screw.

11. An electromagnetic actuator comprising:

housing structure, first and second electromagnets disposed in spaced relation in said housing structure, an armature mounted for reciprocal movement between said electromagnets, and a spring assembly operatively associated with said armature, said spring assembly comprising:

a coil spring, a spring retainer carrying said coil spring and being constructed and arranged to contact said armature, a spring adjusting member engaged with a bore in said housing structure, said spring adjusting member engaging said spring so as to control compression of said spring associated with a set position of said armature between said electromagnets, said spring applying a load to said spring adjusting member in a load direction, at least one cap screw extending from a surface of said housing structure generally-adjacent to said bore, and a locking member engaged with said spring adjusting member and with said cap screw, said cap screw pushing against said locking member in said load direction to prevent movement of the spring adjusting member to maintain the compression of the spring associated with the set position of the armature.

12. A method of adjusting a position of an armature of an electromagnetic actuator, the actuator having a housing structure including a threaded bore therein, first and second electromagnets disposed in spaced relation in the housing structure with the armature being mounted for reciprocal movement between the electromagnets, the actuator including a spring assembly operatively associated with the armature, the spring assembly including a spring, a spring retainer for carrying the spring and having a contact portion constructed and arranged to contact the armature, a spring adjusting member having a spring engaging surface and having external threads, at least one cap screw, and a locking member having a counterbore defining a stop surface for engaging a head of the cap screw, the method including:

placing the spring retainer in the housing structure such that the contact portion thereof is in a position to contact the armature, placing the spring onto the spring retainer so that the spring is carried by the spring retainer, screwing the spring adjusting member into the threaded bore in the housing structure with the spring engaging surface engaging the spring, moving the spring adjusting member within the threaded bore to control compression of the spring thus moving the contact portion into engagement with said armature and adjusting the position of the armature so as to be in an operative position, said spring applying a load to said spring adjusting member in a load direction, screwing the at least one cap screw into the housing structure so as to extend therefrom, screwing the locking member onto the external threads of the spring adjusting member so that the counter bore is generally adjacent to the head of the cap screw, and backing-out the cap screw from the housing structure so that the head of the cap screw engages the stop surface of the locking member, thereby pushing against the locking member in said load direction and thus locking the spring adjusting member to maintain the compression of the spring which is associated with the armature being in the operative position.

13. A compression spring assembly having adjustable spring compression comprising:

a housing, a compression spring operatively coupled to said housing, an adjusting member threadedly engaged with said housing and constructed and arranged to compress said spring whereby said spring applies a load to said adjusting member in a load direction, said adjusting member being adjustable by rotation to vary said load, and at least one locking screw member threadedly engaged in said housing and engaging and loading said adjusting member in said load direction, whereby engagement of said at least one locking screw member with said adjusting member locks said adjusting member with respect to said housing.

14. The assembly according to claim 13, wherein said adjusting member comprises an adjusting member body and a locking member rotatably engaged with said adjusting member body, said at least one locking screw member engaging said locking member.

15. The assembly according to claim 14, wherein said locking member includes at least one counterbore therein defining a stop surface and said locking screw member is a cap screw, a head of said cap screw engaging said stop surface to prevent movement of said locking member and thus said adjusting member.

* * * * *